United States Patent [19]

Siegfried et al.

[11] Patent Number: 4,468,499

[45] Date of Patent: Aug. 28, 1984

[54] THERMOPLASTIC INTERPENETRATING POLYMER NETWORK COMPOSITION AND PROCESS

[75] Inventors: David L. Siegfried, Wescoesville; David A. Thomas; Leslie H. Sperling, both of Bethlehem, all of Pa.

[73] Assignee: Lehigh University, Bethlehem, Pa.

[21] Appl. No.: 382,301

[22] Filed: May 26, 1982

Related U.S. Application Data

[63] Continuation of Ser. No. 200,272, Oct. 24, 1980, abandoned.

[51] Int. Cl.³ ...................... C08L 53/02; C08L 33/02
[52] U.S. Cl. ..................................... 525/301; 525/903; 525/196; 525/93; 525/445; 525/479; 525/455
[58] Field of Search ................ 525/301, 299; 525/903, 525/196, 93

[56] References Cited

U.S. PATENT DOCUMENTS

| | | | |
|---|---|---|---|
| 3,919,354 | 11/1975 | Moore et al. | 260/880 R |
| 4,097,551 | 6/1978 | DiGuilio et al. | 525/301 |
| 4,101,495 | 7/1978 | Patzschki et al. | 525/301 |
| 4,165,347 | 8/1979 | Bauer | 525/69 |

*Primary Examiner*—Carman J. Seccuro
*Attorney, Agent, or Firm*—Ratner & Prestia

[57] ABSTRACT

Chemically blended thermoplastic interpenetrating polymer network compositions, of improved physical and mechanical properties as compared to their mechanically blended counterparts, are produced by forming a solution or mixture of polymeric components and polymerizing in situ, with materials capable of forming physical crosslinks, through mechanisms including block copolymers, ionomeric crosslinking and the incorporation of crystalline regions in semicrystalline homopolymers. The resultant products are in the nature of thermoset materials at room temperature but become thermoplastic at elevated temperatures.

17 Claims, No Drawings

THERMOPLASTIC INTERPENETRATING POLYMER NETWORK COMPOSITION AND PROCESS

This is a continuation of application Ser. No. 200,272, filed Oct. 24, 1980, now abandoned.

TECHNICAL FIELD

This invention pertains to polymeric compositions and particularly to such compositions based upon interpenetrating polymer networks (IPN's) which is essentially thermoplastic, at least above a certain elevated temperature. This invention also pertains to processes for making such compositions.

BACKGROUND OF PRIOR ART

Interpenetrating polymer networks, IPN's, are combinations of two (or more) polymers which have been polymerized and/or crosslinked in the immediate presence of each other [L. H. Sperling, J. Polym. Sci., Macromolecular Reviews, 12, 141 (1977)]. These materials have been shown to make excellent noise and vibration damping materials, U.S. Pat. No. 3,833,404; toughened plastics, German Offenlegungsschrift No. 2,153,987; improved soft contact lenses, German Offenlegungsschrift No. 2,518,904; and many other materials.

Like the related materials, polymer blends, grafts, and blocks, most of the IPN's exhibit greater or lesser degrees of phase separation. The outstanding properties of IPN's arise from the synergistic combination of two dissimilar materials, i.e., an elastomer and a plastic. The IPN's can be considered as a subclass of the graft copolymers, where the crosslinks outnumber the graft sites, and/or dominate the physical properties of interest.

A major shortcoming of these IPN's is their thermoset nature. After one or both polymers form a network, shapability is reduced, and processability in terms of melt flow is very poor.

Simple mechanical blends of two polymers have long been known, and many offer significant improvements over their respective homopolymers. Generally comprised of two (or more) linear polymers, they are thermoplastic, rather than thermoset.

The IPN's noted above depend on covalent crosslinks; however, three types of non-covalent crosslinked IPN's have been generally recognized (as indicated in certain U.S. patents noted below). These make use of multiblock copolymers (U.S. Pat. No. 3,265,765), semicrystalline polymers, and polymers bearing ionic charges (U.S. Pat. Nos. 3,264,272 and U.S. Pat. No. 3,404,134). When two such polymers are blended mechanically, especially such that the development of dual phase continuity is encouraged, a class of materials designated as mechanically blended thermoplastic IPN's arises (U.S. Pat. Nos. 4,041,103; 4,101,605; 3,862,106).

Notwithstanding these prior art teachings, there remains a need for thermoplastic IPN compositions of improved processing and mechanical behavior. It is therefore the general object of the present invention to provide such improved thermoplastic IPN compositions and processes for making such compositions.

BRIEF SUMMARY OF INVENTION

The present invention comprises chemically blended thermoplastic IPN compositions, as contrasted with mechanically blended thermoplastic IPN compositions of the prior art; compositions of this invention are characterized by physical crosslinking of the polymer networks of at least two polymers, polymers I and II. Such compositions may be formed by in situ polymerization of prepolymer or monomer of polymer II in a mutual solution of polymer I with the prepolymer or monomer of polymer II. Three types of non-covalent crosslinking mechanisms are believed useful, including block copolymers, based on glassy blocks, crystalline blocks or hydrogen bonded blocks, ionomeric bonding, and the entrapment of crystalline regions in semicrystalline homopolymers.

Compositions of the present invention are believed to involve a novel hybrid of polymer network bonding, which include certain qualities of both thermoplastic blends and thermoset materials. In general, compositions of the present invention flow at elevated temperatures (above 35° C., for example) and, in preferred embodiments, with an unexpectedly low viscosity. While at a lower temperature (below 35° C., for example) they behave as thermosets in that they substantially do not flow. The term "thermoplastic" as used herein refers to this dual characteristic.

Typically, phase domain regions in compositions of the present invention have maximum cross section dimensions below 500 nanometers, preferably on the order of 100–200 nanometers. This compares to dimensions on the order of 500–2000 nanometers for essentially the same chemical combinations in mechanically blended thermoplastic IPN compositions.

The range of materials which may be incorporated in the present invention includes reinforced elastomers, flexible leathers, and tough plastics.

Essentially, any combination of multi-block copolymer, ionic polymer or semicrystalline polymer may be combined in a composition in accordance with the present invention. The combined polymers may also have the same mode of non-covalent type crosslinking (for example, both polymers may be ionic) or different modes.

A preferred embodiment of the invention employs as the first polymer, a triblock copolymer composed of poly(monoalkenyl arene)/polydiene/poly(monoalkenyl arene) and, as the second polymer, an ionic form of poly(monoalkenyl arene). As an especially preferred embodiment, the center block of the triblock copolymer is either hydrogenated, or prepared from a saturated elastomer. An example is a block copolymer having selectively hydrogenated conjugated diene blocks as disclosed in U.S. Pat. No. 3,595,942.

The preferred composition of the second polymer is a random copolymer of styrene and methacrylic acid. After the synthesis of poly(methacrylic acid-copolymerized with styrene) within the triblock copolymer, a suitable base, such as NaOH or CsOH is added, neutralizing the methacrylic acid mer, bringing about the ionic form of the polymer.

DETAILED DESCRIPTION OF INVENTION INCLUDING PREFERRED EMBODIMENT

As indicated above, three types of physical crosslinks provide the type of bonding important to the present invention:

1. Block copolymers
   (a) Glassy blocks
   (b) Crystalline blocks
   (c) Hydrogen bonded blocks 2. Ionomeric sites
3. Crystalline regions in semicrystalline homopolymers In general, any combination of these will provide the requisite physical crosslinking to make a thermoplastic IPN. Of course, the polymers chosen and the particular end use may dictate particular combinations of the above.

Block copolymers useful in this invention include triblock, multiblock materials, and star block materials containing at least one elastomeric block and at least two blocks of the physical crosslinking type. An elastomer (or rubber) is defined as a polymer having a glass transition temperature below 25° C., and preferably below 0° C.

The physical crosslinking block types may be glassy, crystalline, or hydrogen bonded as mentioned above. By glassy blocks is meant any polymer with a glass-rubber transition temperature above about 25° C., and preferably above about 50° C., to be useful. Poly(monoalkenyl arene) materials such as polystyrene are widely employed for this purpose.

An example of a crystalline block is poly(diphenyl siloxane). Other examples include nylon and polyester materials, a specific example of which is "HYTREL", made by Dupont, poly(butylene terephthalate)polytetrahydrofuran (G. K. Hoeschele, *Polymer Engineering and Science*, Vol. 14, Page 848 (1974)). In general, the crystalline blocks (as well as the crystalline regions in the semicrystalline homopolymers, item 3 above) must melt above about 25° C., and preferably above about 50° C., to be useful.

The central elastomeric block can be a diene, such as polybutadiene, polyisoprene, or their copolymers, or a saturated or hydrogenated chain such as poly(ethylene-co-butylene) (as taught in U.S. Pat. No. 3,595,942). Siloxanes, such as poly(dimethyl siloxane) may also serve.

An example of the hydrogen bonded blocks are the so-called segmented polyurethanes, where a series of polyether or polyester prepolymer segments are bonded together with polar, hydrogen bonded polyurethane segments, an example of which is "ESTANE", made by B. F. Goodrich Co., as shown in U.S. Pat. No. 2,871,218.

Other block copolymers useful in this invention include ester-ether alternating block copolymers (as disclosed in U.S. Pat. Nos. 3,023,192 and 3,651,014), and ether-nylon alternating block copolymers (as disclosed in U.S. Pat. No. 3,862,262).

Ionomeric sites can be placed on many kinds of polymers. Typical ionic sites may be carboxyl, sulfonate, or amine in nature. Important carboxylic bearing monomers include acrylic acid, methacrylic acid, maleic acid anhydride, etc., which when copolymerized, may be neutralized with a base (or acid) to form ionic sites. Neutralization may be with alkalis, alkaline earths, amines, or ammonia, usually in aqueous solution. An amine bearing polymer (primary, secondary, tertiary or quaternized) can be neutralized by appropriate acids, such as HCl. In a preferred method for carboxyl containing polymers, NaOH solutions are employed.

Semicrystalline homopolymers include materials such as high density and low density polyethylene, polypropylene, isotactic or syndiotactic poly(monoalkenyl arenes), nylons, polyesters, poly(vinyl halides) poly(vinylidene halides), cellulose, cellulose derivatives, etc.

With regard to the method of combining starting materials for purposes of the present invention, it should be noted first that the art of dissolving a monomer II mix into a polymer I, and polymerizing II in situ is well known (U.S. Pat. No. 2,694,692). In general, the in situ polymerization may occur in any intimate interdispersion (typically true solutions) of these materials, so long as there is at least one continuous phase. Any such mixture is encompassed herein within the term "mutual solution". Such in situ polymerization techniques normally generate so-called graft copolymers, with greater or lesser quantities of actual grafting. High impact polystyrene and ABS plastics made this way do not exhibit dual phase continuity, nor are any physical crosslinking modes present. Bulk, suspension, or solution polymerization techniques may be employed.

However, when both polymers are capable of forming physical crosslinks, thermoplastic IPN's result. In a binary polymer mixture, at least one phase will be continuous. When both polymers exhibit dual phase continuity, in addition, improved properties result. In a composition of three or more polymers, multi-phase continuity is similarly preferred.

COMPOSITIONS IN ACCORDANCE WITH THE PRESENT INVENTION

Current theories suggest that dual phase continuity develops when the melt viscosities of two components are substantially equal. While the chemical blending of two equal viscosity polymers meets the basic requirements, a preferred method of achieving the desired viscosity conditions is through controlled alteration of the melt viscosity in one or both components. For example, if one of the polymers contains carboxyl groups in acid form, partial conversion to the salt form results in a substantial increase in the melt viscosity of that polymer. In this particularly preferred method, the physical crosslink capability is simultaneously imparted.

Any of several classes of machines capable of heating and mixing polymer melts can be employed in forming salts for purposes of the present invention. In a preferred method a chemical blend containing one or both polymers in the acid form is heated on a Brabender Plasticorder. While the mixing operation is in progress, the required amount of base is added. In a preferred method, the temperature is over 100° C., and an aqueous sodium hydroxide solution is added. The water is flashed off as steam, leaving a finely divided alkaline material which readily neutralizes the required polymer(s) (as taught for example in U.S. Pat. Nos. 3,264,272 and 3,404,134). In general, alkalis, alkaline earths, amines, and/or ammonia may be used. The preferred form is in aqueous solution.

During the neutralization reaction, the melt viscosity of the polymer increases. In the presence of the melt blending operation, desirable morphological transformations take place, especially as the ionic polymer has its melt viscosity increased so that it is roughly equal to the other polymer, or surpasses it by a controlled amount.

Depending on the weight fractions of the two polymers, the melt viscosity of the two polymers should be within a factor of 10 of each other, and preferably within a factor of two of each other. After neutralization and mixing are complete, the reacted mass is formed into the desired shape and cooled. Since it is thermoplastic on heating, it may be removed from the blender, cooled, transported, reheated and then molded.

A particular advantage of the thermoplastic nature of the final reacted mass is that flashing or other waste portions may be reused.

Compositions in accordance with the present invention may also include fillers and additives for various purposes. Examples of such possible filler materials are carbon black, silicas, talc, calcium carbonate, fiberglass, boron fibers, carbon fibers, and polymeric fillers.

Similarly, extending oils and plasticizers may be used to modify the properties of the composition, dyes and colorants may be added for practical or esthetic reasons and antioxidants, anti-ozonants, or stabilizers may be incorporated, as required.

As mentioned above, current theories suggest that equal melt viscosities of two polymers in a mixture lend the polymers to dual phase continuity. Property measurements (described below) show that many of the materials within this invention do, in fact, have dual phase continuity, which is preferred in accordance with the present invention.

EXPERIMENTAL DATA AND EXAMPLES

The following experimental sequences demonstrate a range of syntheses of starting materials, examples of the present invention and comparable materials outside of the present invention and, in some cases, a comparison of properties of the products of these experiments.

Experiment 1

Molding of a commercial thermoplastic elastomer. A styrene-b-ethylene-cobutylene-b-styrene (hereafter SEBS), triblock copolymer, designated Kraton G-1652, obtained from the Shell Development Company, had a styrene content of 29% by weight and had the approximate block molecular weights: $8 \times 10^3$ gms/mole, S; $39 \times 10^3$ gms/mole, EB; $8 \times 10^3$ gms/mole, S, and was prepared through anionic polymerization procedures, followed by hydrogenation. Clear sheets of this SEBS were formed from the white crumbs by molding for 5 minutes at 165° C. under 15 tons of platen pressure.

Experiment 2

Preparation of a plastic ionic polymer precursor. To 90 parts by volume of styrene, 10 parts by volume of methacrylic acid, and 1 part by volume isoprene, were added 0.4 parts by weight of benzoin, a photoinitiator. The solution was placed between glass plates, and polymerized for 72 hours in the presence of U.V. radiation. This material is designated hereafter as SMAAI.

Experiment 3

Preparation of an elastomer ionic polymer precursor (i.e., polymerized but not neutralized and therefore not cross-linked). The following recipe for the emulsion polymerization of a carboxylic elastomer was employed: The monomer mix consisted of 71 parts by weight of butadiene, 19 parts by weight of styrene, 10 parts by weight of methacrylic acid, and 0.5 parts by weight of dodecyl mercaptan, a chain transfer agent. The water phase contained 180 parts by weight of deionized water, 1 part by weight of Aerosol MA-80% nonionic surfactant (sodium dihexyl sulfosuccinate-American Cyanamid Co.), and 0.3 parts by weight of potassium persulfate, a free-radical initiator. The emulsion polymerization was carried out in sealed pressure reaction bottles rotated in a constant 45° C. water bath for 16 hours. At this time, the unreacted butadiene was vented, and the latex was coagulated using diluted HCl, washed alternately with deionized water and methanol until washings had a pH of 7, and dried at room temperature in vacuum. This material was designated as BSMAA, and is an elastomer that can be dissolved in a toluene/methanol (90/10 by volume) solvent mixture.

Experiment 4

Mechanically blended thermoplastic IPN (for comparison to the chemically blended composition of the present invention). Twenty-one grams of Kraton G-1652 (characteristics in Example (1) and 21 grams of the plastic ionic polymer precursor from Experiment 2 were placed in a Brabender Plasticorder Torque Rheometer. Blending was carried out at 50 RPM's for 35 minutes at 180° C. As the blend fused, 1 wt % of an antioxidant system was added (0.5 wt % of an organic phosphite (MARK 1775-WITCO Chemical Co.) and 0.5 wt % of a hindered alkylidene bisphenol (Ethyl Antioxidant 330-Ethyl Corp.). After fusion was completed, a 10% aqueous solution of NaOH was added, which contained the stoichiometric amount of base required to neutralize the methacrylic acid mers. This yields a 50/50 SEBS+SMAAI-Na salt mechanically blended thermoplastic elastomer. This material, well known to the art, provides a basis for comparison to the materials of the present invention.

Experiment 5

Experiment 4 was repeated, except that a 25/75 SEBS+SMAAI-Na salt composition was prepared.

Experiment 6

Experiment 4 was repeated, except that a 75/25 SEBS+SMAAI-Na salt composition was prepared at 185° C. instead of 180° C.

Experiment 7

Chemically blended thermoplastic IPN's (exemplary of the present invention). (Mutual solutions of Kraton G-1652 and SMAAI monomer mix may be considered as dissolving either component in the other, depending on the final desired composition ratio.) Fifty parts of Kraton G-1652 (described in Experiment 1) were mixed with 45 parts of styrene, 5 parts of methacrylic acid, 0.5 parts of isoprene and 0.2 parts of benzoin. After uniform mutual solution was obtained, the solution was subjected to photopolymerization as illustrated in Experiment 2. (The incorporation of 1 wt % isoprene in polymer II permitted improved characterization of the phase inversion and/or cocontinuity aspects via electron microscopy of OsO₄ stained samples. Minimal property changes were brought about; see Experiment 13.) This procedure produced a 50/50 SEBS/SMAAI composition. (A slash between polymer I and polymer II indicates the chemical blend. The plus (+) sign used in Experiment 4 indicates the mechanical blend.)

Experiment 8

Neutralization of the chemical blend. Forty-two grams of the product from Experiment 7 were placed in the Plasticorder. As per Experiment 4, blending was carried out at 50 RPM's for 35 minutes at 180° C. During the first portion of the blending time 1 wt % of an antioxidant system consisting of 50% Mark 1775 (Witco Chemical Corp.) and 50% Ethyl Antioxidant 330 (Ethyl Corporation) was added. After fusion of the chemical blend was achieved, a 10% aqueous solution of NaOH was added, which contained the stoichiometric amount of base required to neutralize the methacrylic acid mers. A tough, leathery material resulted.

Experiment 9

Experiment 8 was repeated, using CsOH as the base. The properties of the CsOH neutralized material were substantially identical to the NaOH neutralized material. Cesium, as a heavy atom, was useful in identifying morphological changes and inversions via electron microscopy. In some examples, CsOH was therefore used instead of NaOH.

Experiment 10

Experiment 9 was repeated, but only enough CsOH was added to neutralize 15% of the methacrylic acid mers.

Experiment 11

Experiment 9 was repeated, but only enough CsOH was added to neutralize 25% of the methacrylic acid mers.

Experiment 12

Experiment 9 was repeated, but only enough CsOH was added to neutralize 50% of the methacrylic acid mers. (The purpose of Experiments 10, 11, and 12 was to provide nearly equal melt viscosities for the SEBS and the SMAAI-Cs components. Thus a control over morphology and phase continuity was achieved by appropriate extent of neutralization.

Experiment 13

Experiment 7 was repeated, but the one part of isoprene was deleted. The properties were substantially unaffected. (The isoprene addition permitted improved characterization of the phase inversion and/or cocontinuity aspects via electron microscopy of $OsO_4$ stained samples. In most experiments, isoprene was incorporated for characterization purposes.) After neutralization, a tough, leathery material resulted.

Experiment 14

Experiments 7 and 8 were repeated, except that a 25/75 SEBS/SMAAI-Na composition was prepared. A hard, leathery material resulted.

Experiment 15

Experiments 7 and 8 were repeated except that a 35/65 SEBS/SMAAI-Na composition was prepared. A hard, leathery material resulted.

Experiment 16

Experiments 7 and 8 were repeated, except that a 75/25 SEBS/SMAAI-Na composition was prepared. A tough, elastomeric material resulted.

It is again noted that the incorporation or deletion of 1% isoprene, and/or the use of sodium instead of cesium do not substantially alter the physical or rheological properties.

Experiment 17

Ionomer/ionomer composition. Fifteen parts of the elastomer ionic precursor composition from Experiment 3 were dissolved in 85 parts of monomer mix described in Experiment 2. After photopolymerization, this chemical was designated 15/85 BSMAA/SMAA (neither component yet cross-linked).

Experiment 18

Forty-two grams of the chemical blend described in Experiment 17 were neutralized (to cross-link both components) in a Plasticorder as illustrated in Experiment 8. A tough plastic resulted.

Experiment 19

Chemical blending of a 50/50 SEBS/SMAAI by suspension polymerization. To 500 ml of deionized water in a Pyrex reaction kettle was added 1 g of poly(vinyl alcohol), a suspending agent, with stirring. After dissolution of the poly(vinyl alcohol), 50 grams of the SEBS, existing as white crumbs of varied sized but less than 1 mm in diameter were added while stirring continued at 60° C. A monomer mix consisting of 45 grams of styrene, 5 grams of methacrylic acid, 1 gram of isoprene, and 0.5 g of benzoyl peroxide, a free-radical initiator, was charged to the reaction kettle and the temperature was increased from 60° C. to 100° C. over a period of 4 hours. The reaction proceeded for another 12 hours at which time it was stopped. The suspended product was filtered, washed with deionized water until washings were clear and had a neutral pH, and dried in an air oven at 75° C. overnight. The material prepared by this route was a white, granular substance, eminently suitable for further operations.

Experiment 20

The 50/50 SEBS/SMAAI material in Experiment 19 was neutralized in the Plasticorder as described in Experiment 8.

Experiment 21

Melt torque as determined in the Plasticorder. On neutralization, the melt torque (roughly proportional to melt viscosity) rises significantly, then approaches a constant value. Table 1 shows the initial and final torque values (in m-gms) for selected examples of interest at 180° C.–185° C.

It will be noted that:

(1) Control runs, without addition of base, resulted in less than 10% increase in torque.
(2) The percent increase in torque was less with the chemical blends than with the mechanical blends. For instance, Experiment 8 (26%) is less than Experiment 4 (62%).

TABLE 1

Selected Initial and Final Torque Values

| Experiment No. | Material | Percent Neutralization | Initial Torque (meter-grams) | Final Torque (meter-grams) | Percent Change |
|---|---|---|---|---|---|
| 1 | Kraton G-1652 | — | 1900* | 1900* | — |
| 2 | SMAAI | 100 | 1175 | 4400 | 275 |
| 4 | 50/50 SEBS + SMAAI | 100 | 1265 | 2050 | 62 |
| 5 | 25/75 SEBS + SMAAI | 100 | 1100 | 3225 | 193 |
| 6 | 75/25 SEBS + SMAAI | 100 | 1400 | 2025 | 45 |
| 8 | 50/50 SEBS/SMAAI | 100 | 1265 | 1600 | 26 |
| 10 | 50/50 SEBS/SMAAI | 15 | 1325 | 1400 | 6 |
| 11 | 50/50 SEBS/SMAAI | 25 | 1325 | 1400 | 6 |
| 12 | 50/50 SEBS/SMAAI | 50 | 1125 | 1270 | 13 |
| 14 | 25/75 SEBS/SMAAI | 100 | 1340 | 1925 | 44 |
| 15 | 35/65 SEBS/SMAAI | 100 | 1125 | 1525 | 36 |
| 16 | 75/25 SEBS/SMAAI | 100 | 1375 | 1525 | 11 |
| 18 | 15/85 BSMAA/SMAAI | 100 | 1050 | 3850 | 267 |
| 20 | 50/50 (suspension) SEBS/SMAAI | 100 | 1040 | 2240 | 115 |

*determined at 195° C.

Experiment 22

Mechanical properties. The tensile properties of several selected samples were determined on an Instron, at ambient conditions. These samples were obtained from compression molded sheets formed at 180° C. under 15 tons of platen pressure for 5 minutes. Tensile strengths (in psi), % strain at break and Young's modulus (in psi) from the initial slope were determined. At least three specimens of each sample were tested and the average reported. Samples were cut to standard dimensions (ASTM D-638-68), polished to remove any visible flaws, and tested at a crosshead speed of 2.0 in/min (except 25/75 compositions were 0.2 in/min). Values were obtained in each case for the acid material, and the fully neutralized material. The results are shown in Table 2.

It will be noted that:

(1) In general, the acid forms are softer and weaker than the salt forms (after neutralization).

(2) The chemically blended thermoplastic IPN's have a higher tensile strength, higher elongation at break, and a lower Young's modulus than the corresponding mechanically blended thermoplastic IPN's. This is seen by comparing the properties of the salt(s) forms of Experiment 8 to Experiment 4.

TABLE 2

| Experiment No. | Material | Tensile Strength (psi) | % Strain at Break | Young's Modulus (psi) |
|---|---|---|---|---|
| 1 | SEBS | $3.7 \times 10^3$ | 955 | $4.1 \times 10^3$ |
| 2 | SMAAI(a)* | — | — | — |
|   | SMAAI(s) | — | — | — |
| 4 | 50/50 | | | |
|   | SEBS + SMAAI(a) | $1.6 \times 10^3$ | 84 | $2.9 \times 10^4$ |
|   | SEBS + SMAAI(s) | $2.4 \times 10^3$ | 200 | $4.5 \times 10^4$ |
| 5 | 25/75 | | | |
|   | SEBS + SMAAI(a) | $3.0 \times 10^3$ | 11 | $1.3 \times 10^5$ |
|   | SEBS + SMAAI(s) | $2.8 \times 10^3$ | 4 | $1.3 \times 10^5$ |
| 6 | 75/25 | | | |
|   | SEBS + SMAAI(a) | $3.5 \times 10^3$ | 700 | $1.1 \times 10^4$ |
|   | SEBS + SMAAI(s) | $3.8 \times 10^3$ | 830 | $1.2 \times 10^4$ |
| 8 | 50/50 | | | |
|   | SEBS/SMAAI(a) | $3.2 \times 10^3$ | 390 | $1.2 \times 10^4$ |
|   | SEBS/SMAAI(s) | $3.7 \times 10^3$ | 410 | $3.1 \times 10^4$ |
| 14 | 25/75 | | | |
|   | SEBS/SMAAI(a) | $3.1 \times 10^3$ | 15 | $1.1 \times 10^5$ |
|   | SEBS/SMAAI(s) | $3.8 \times 10^3$ | 46 | $1.1 \times 10^5$ |
| 16 | 75/25 | | | |
|   | SEBS/SMAAI(a) | $3.3 \times 10^3$ | 930 | $2.4 \times 10^3$ |
|   | SEBS/SMAAI(s) | $3.9 \times 10^3$ | 960 | $2.9 \times 10^3$ |

*(a) and (s) refer to the acid and salt forms, respectively.

Experiment 23

Variations in processing shear rate and temperature. Processing conditions for 50/50 blends were varied to observe the effect of increased processing shear rate and temperature on the melt torque and ultimate tensile properties of thermoplastic IPN's. Experiment 8 (a chemical blend) was repeated using CsOH as the base and blending at 50 RPM's for 35 minutes at 200° C. under a nitrogen atmosphere.

Experiment 24

Experiment 23 was repeated, but blending was carried out at 150 RPM's.

Experiment 25

Experiment 4 (a mechanical blend) was repeated using CsOH as the base and blending at 50 RPM's for 35 minutes at 200° C. under a nitrogen atmosphere for a 50/50 SEBS+SMAAI composition.

Experiment 26

Experiment 25 was repeated, except that blending was carried out at 150 RPM's.

Experiment 27

Experiment 26 was repeated, except that blending was carried out at 180° C.

Experiment 28

Melt torque was determined in the plasticorder. Table 3 shows the initial and final torque values (in m-gms) for 50/50 examples processed in Experiments 23–27.

It will be noted that:
1. The percent increase in torque on neutralization was less with the chemical blends than with the mechanical blends processed at the same temperature and shear rate.
2. As shear rate increases from 50 RPM's to 150 RPM's, the percent increase in torque decreases significantly for both chemical blends and mechanical blends.

TABLE 3

Torque Values for 50/50 Blends With 100% Neutralization by CsOH

| Experiment No. | Material | T°C. | RPM's | Initial Torque (meter-grams) | Final Torque (meter-grams) | Percent Change |
|---|---|---|---|---|---|---|
| 23 | SEBS/SMAAI | 200 | 50 | 1150 | 1440 | 25 |
| 24 | SEBS/SMAAI | 200 | 150 | 1100 | 1250 | 14 |
| 25 | SEBS + SMAAI | 200 | 50 | 990 | 1675 | 69 |
| 26 | SEBS + SMAAI | 200 | 150 | 1075 | 1350 | 26 |
| 27 | SEBS + SMAAI | 180 | 150 | 1190 | 1725 | 41 |

Experiment 29

Mechanical Properties. As described in Experiment 22, tensile properties were determined on an Instron. The results are shown in Table 4 for materials from Experiments 23–27.

It will be noted that:
(1) Blending at 150 RPM's instead of 50 RPM's does not significantly alter the tensile properties of a chemically blended thermoplastic IPN.
(2) Blending at 150 RPM's and 200° C. improves the percent strain at break for a mechanically blended thermoplastic IPN.

TABLE 4

Effect of Brabender Shear Rate and temperature on Mechanical Properties for 50/50 Blends with 100% Neutralization by CsOH

| Experiment No. | Material | T°C. | RPM's | Tensile Strength (psi) | % Strain at Break | Young's Modulus (psi) |
|---|---|---|---|---|---|---|
| 23 | SEBS/SMAAI | 200 | 50 | $2.9 \times 10^3$ | 344 | $2.8 \times 10^4$ |
| 24 | SEBS/SMAAI | 200 | 150 | $2.3 \times 10^3$ | 353 | $2.2 \times 10^4$ |
| 25 | SEBS + SMAAI | 200 | 50 | $1.7 \times 10^3$ | 200 | $3.9 \times 10^4$ |
| 26 | SEBS + SMAAI | 200 | 150 | $1.5 \times 10^3$ | 380 | $3.4 \times 10^4$ |
| 27 | SEBS + SMAAI | 180 | 150 | $1.5 \times 10^3$ | 184 | $2.9 \times 10^4$ |

Statement of Industrial Utility

From the foregoing, it will be appreciated that new compositions of significant practical utility are disclosed herein. In particular, the chemically blended thermoplastic IPN network composition of this invention may find a wide range of applications, depending on composition. Possible uses include shock absorbing components of automotive bumpers, electrical wire insulation, hot melt adhesives, toys or toy components, gaskets, O-rings, hosing, shoe heels and soles, manmade leather goods, recyclable elastomers and plastics, and noise and vibration damping compounds. On dissolving one or the other polymer, a molecular sieve may result.

While this invention has been described with respect to particular compositions and applications and methods of preparation, it is not limited thereto and the appended claims are intended to be construed to encompass not only the forms of the present invention described herein but also to such other modifications and variations thereof as may be devised by those skilled in the art, which modifications and variations are however within the true spirit and scope of the present invention.

We claim:

1. A composition comprised of at least two polymers, the second of which is polymerized in the presence of the first of said polymers in a mutual solution of said first polymer and a prepolymer or monomer of said second polymer, at least one of said polymers comprising a continuous phase within said composition, said polymers being crosslinked by a non-covalent bonding mechanism selected from the group consisting of
   (a) ionomeric attraction; and
   (b) block copolymers, each having at least three blocks, at least one of said blocks comprising an elastomeric block and at least two of said blocks comprising physically crosslinked glassy blocks, crystalline blocks, or hydrogen bonded blocks, wherein one of said polymers is a triblock copolymer containing monoalkenyl arene polymer end blocks and the other of said polymers is a monoalkenyl arene monomer copolymerized with an acid forming mer, further wherein from 10 to 100% of said mer is first neutralized by one of an alkali or alkaline earth hydroxide or amine,
said polymers forming interpenetrating polymer networks, said composition being thermoplastic and having phase domain regions with maximum cross sections below 500 Nanometers.

2. A composition comprised of at least two polymers, the second of which is polymerized in the presence of the first of said polymers in a mutual solution of said first polymer and a prepolymer or monomer of said second polymer, at least one of said polymers comprising a continuous phase within said composition, both of said polymers being crosslinked by a non-covalent bonding mechanism consisting of ionomeric attraction,
   wherein one of said polymers is a diene copolymer and the other of said polymers is a monoalkenyl arene copolymer, each of said copolymers containing 2-20%, by weight, of a copolymerized acid-forming mer,
   said polymers having 10 to 100 percent of the acid mers neutralized by a base and forming interpenetrating polymer networks, said composition being thermoplastic and having phase domain regions with maximum cross sections below 500 Nanometers.

3. A composition, as recited in claim 1, wherein the center block of said triblock comprises a diene or hydrogenated diene polymer.

4. A composition, as recited in claim 1, wherein said acid mer comprises 2-20%, by weight, of said monoalkenyl arene copolymer.

5. A composition, as recited in claim 1, wherein said monoalkenyl arene is styrene.

6. A composition, as recited in claim 1, wherein each of said polymers comprises at least 25%, by weight, of said composition.

7. A composition, as recited in claim 2, wherein said salt-forming mers are acid groups, neutralized with an alkali or alkaline earth hydroxide or amine.

8. A composition, as recited in claim 2, wherein said diene is butadiene.

9. A composition, as recited in claim 2, wherein said monoalkenyl arene is styrene.

10. A composition, as recited in claims 1 or 2, having dual or multi-phase continuity.

11. A process for making chemically blended thermoplastic interpenetrating network polymer compositions, said process comprising:
   (A) making a mutual solution of:
      (i) a first polymer cross-linked or capable of being cross-linked by a non-covalent bonded physical cross-linking mechanism, and
      (ii) a monomer or prepolymer of a second polymer capable of being polymerized and cross-linked by a non-covalent bonded physical cross-linking mechanism,
   wherein each of said non-covalent bonded physical cross-linking mechanisms is selected from the group consisting of
      (a) ionomeric attraction; and
      (b) block copolymers, each having at least three blocks, at least one of said blocks comprising an elastomeric block and at least two of said blocks comprising physically crosslinked glassy blocks, crystalline blocks, or hydrogen bonded blocks, wherein one of said polymers is a triblock copolymer containing monoalkenyl arene polymer end blocks and the other of said polymers is a monoalkenyl arene monomer copolymerized with an acid forming mer, and
   (B) polymerizing said monomer or prepolymer in said mutual solution and neutralizing 10 to 100 percent of the acid mers with a base to form interpenetrating polymer networks thereof, said composition being thermoplastic and having phase domain regions with maximum cross sections below 500 Nanometers.

12. A process, as recited in claim 11, wherein said mutual solution is stirred as said monomer or prepolymer or polymerized.

13. A process, as recited in claim 11, wherein said mutual solution is a true solution.

14. A process, as recited in claim 11, wherein said mutual solution is an intimate interdispersion of said first polymer and said monomer or prepolymer.

15. A process, as recited in claims 11, 12, 13, or 14 wherein one of said polymers is a triblock copolymer containing monoalkenyl arene polymer end blocks and the other of said polymers is a monoalkenyl arene monomer copolymerized with an acid forming mer, said process further including adding to and mixing with said polymerized solution an alkali or alkaline earth metal hydroxide or amine in an amount sufficient to neutralize 10 to 100% of said acid forming mer.

16. A composition, as recited in claim 1, wherein said monoalkenyl arene monomer copolymerized with an acid forming mer, comprises the second of said polymers.

17. The method of claim 11, wherein a strong base is introduced into the polymerization (blending) step in an amount sufficient to induce physical cross-linking of the first and second polymers, thereby producing thermoplastic interpenetrating polymer networks of improved elastomeric tensile strength, elongation at break, and lowered Young's modulus properties.

* * * * *